(12) United States Patent
George

(10) Patent No.: US 11,723,306 B2
(45) Date of Patent: Aug. 15, 2023

(54) RIDING LAWN MOWER

(71) Applicant: ATACO STEEL PRODUCTS CORP., Cedarburg, WI (US)

(72) Inventor: Thomas J. George, Pewaukee, WI (US)

(73) Assignee: ATACO STEEL PRODUCTS CORP.

(*) Notice: Subject to any disclaimer, the term of this patent is extended or adjusted under 35 U.S.C. 154(b) by 64 days.

(21) Appl. No.: 17/346,511

(22) Filed: Jun. 14, 2021

(65) Prior Publication Data

US 2022/0312674 A1 Oct. 6, 2022

Related U.S. Application Data

(63) Continuation of application No. 17/220,609, filed on Apr. 1, 2021, now Pat. No. 11,147,209.

(51) Int. Cl.

| | | |
|---|---|---|
| *A01D 34/78* | (2006.01) |
| *B60N 2/30* | (2006.01) |
| *B62D 21/14* | (2006.01) |
| *B62D 33/08* | (2006.01) |
| *A01D 69/02* | (2006.01) |
| *A01D 101/00* | (2006.01) |
| *B62D 31/00* | (2006.01) |

(52) U.S. Cl.
CPC ............ *A01D 34/78* (2013.01); *A01D 69/02* (2013.01); *B60N 2/3011* (2013.01); *B62D 21/14* (2013.01); *B62D 33/08* (2013.01); *A01D 2101/00* (2013.01); *B62D 31/006* (2013.01)

(58) Field of Classification Search
CPC .......... A01D 34/00; A01D 34/78; B60N 2/02; B60N 2/0224; B60N 2/04; B60N 2/16; B60N 2/20; B60N 2/206; B60N 2/3002; B62D 31/006

USPC ........................................................ 180/208
See application file for complete search history.

(56) References Cited

U.S. PATENT DOCUMENTS

| | | |
|---|---|---|
| 4,770,440 A | 9/1988 | Lander |
| 5,463,853 A | 11/1995 | Santoli et al. |

(Continued)

FOREIGN PATENT DOCUMENTS

| | | |
|---|---|---|
| CN | 110741810 | 2/2020 |
| DE | 29917475 U | 12/1999 |

(Continued)

OTHER PUBLICATIONS

EDGE All Electric Zero Turn Riding Mower, https://www.youtube.com/watch?v=oj04OZ5dSpM, video dated Jan. 9, 2019, printed Mar. 31, 2021 (screenshots provided).

(Continued)

*Primary Examiner* — Jason S Daniels
(74) *Attorney, Agent, or Firm* — Becker Patent Law, LLC

(57) ABSTRACT

A riding lawn mower having an adjustable cutting width has at least one front wheel, a plurality of rear wheels, a frame extending from the at least one front wheel to the plurality of rear wheels and a plurality of cutting decks, each cutting deck comprising a cutting blade. A motor is supported by the frame and configured to drive the cutting blades of the cutting decks. A support configured to couple the cutting decks to the frame. The support is configured to extend at least one of the cutting decks laterally from beneath the frame to adjust a cutting width provided by the blades.

20 Claims, 16 Drawing Sheets

(56) References Cited

U.S. PATENT DOCUMENTS

| | | | |
|---|---|---|---|
| 6,560,952 B2 | 5/2003 | Patton et al. | |
| 6,851,498 B1 * | 2/2005 | Sauve | B60N 2/24 280/639 |
| 7,493,711 B2 | 2/2009 | Gautreau et al. | |
| 7,975,786 B2 | 7/2011 | Ishii et al. | |
| 8,627,910 B1 | 1/2014 | Carque | |
| 10,486,733 B2 * | 11/2019 | Moujoud | B62K 5/007 |
| 2005/0077097 A1 | 4/2005 | Kosco et al. | |
| 2009/0308676 A1 | 12/2009 | Wang | |
| 2012/0279192 A1 * | 11/2012 | Newell | A01D 34/82 56/229 |
| 2016/0293906 A1 | 10/2016 | Ito et al. | |
| 2019/0075724 A1 | 3/2019 | Becke et al. | |
| 2020/0156727 A1 | 5/2020 | Chang | |
| 2020/0205338 A1 * | 7/2020 | Zeiler | A01D 34/71 |
| 2020/0216117 A1 * | 7/2020 | Chiu | B62K 15/008 |
| 2022/0304226 A1 * | 9/2022 | Yang | A01D 34/78 |

FOREIGN PATENT DOCUMENTS

| | | |
|---|---|---|
| DE | 102007048023 | 4/2009 |
| EP | 0981944 | 3/2000 |
| FR | 1362740 | 6/1964 |
| WO | 2013002773 | 1/2013 |
| WO | 2019129129 | 7/2019 |

OTHER PUBLICATIONS

75 AH 42" Zero Turn Electric Riding Mower | RYOBI Tools, printed from https://www.ryobitools.com/products/details/75-ah-zero-turn-electric-riding-mower on Mar. 31, 2021.

Stihl RT 6127 ZL Ride-On Mower 49" | Dermot Casey, printed from https://dermotcasey.com/product/mt-6127-zl-ride-mower/ on Mar. 31, 2021.

2020 Snapper® Classic Rear Engine Riding Lawn Mower | Logan's Equipment,, printed from https://www.logansequipment.com/inventory/v1/2020/Snapper/Riding-Lawn-Mowers/Classic-Rear-Engine-Riding-Lawn-Mower/Intek-28-in-Copenhagen-New-York-14042281 on Mar. 31, 2021.

100 AH 42" Zero Turn Electric Riding Mower | RYOBI Tools, printed from https://www.ryobitools.com/products/details/100-ah-zero-turn-electric-riding-mower on Mar. 31, 2021.

Classic Rear Engine Riding Lawn Mower, Snapper, printed from https://www.snapper.com/na/en_us/product-catalog/residential/riding-mowers/classic-rear-engine-riding-lawn-mower.html, 4 pages.

The John Deere Journal, printed from https://johndeerejournal.com/2016/07/new-mower-app-from-john-deere/ on Mar. 31, 2021.

Machine translation of FR1362740 to Zweirad-Union, 19 pages.

Ryobi Operator's Manual Electric Zero Turn Mower RY48ZTR75/RY48ZTR100/RY48ZTR75CAN/RY48ZTR100CAN/ pp. 1-34—English and last two pages, Nov. 22, 2019 (REV:07).

* cited by examiner

RIDING LAWN MOWER

CROSS-REFERENCE TO RELATED APPLICATIONS

This application is a continuation of U.S. application Ser. No. 17/220,609, filed Apr. 1, 2021, which is incorporated herein by reference in its entirety.

BACKGROUND

The present application relates to riding lawn mowers and methods relating thereto. More specifically, the present application relates to improved features of riding lawn mowers of various types, such as those having gas engines, electric engines, horizontal-crankshaft engines, zero-turn features, etc.

Riding lawn mowers come in a variety of types and sizes for different applications. For home use on lawns of 1 to 1.5 acres, a riding lawn mower can be useful in tackling the time-consuming tasks of mowing, thatching, aerating, rolling and other lawn-care and yard tasks. The mower should be large enough to handle these tasks efficiently. However, a larger mower requires greater storage space in a garage or shed. Riding lawn mowers tend to be wide, long and high, due to the seat, gas motor, etc.

Electric riding mowers can provide reduced noise and low emissions. However, current electric riding mowers are large and bulky.

DESCRIPTION OF THE DRAWINGS

Like reference numbers represent corresponding parts throughout.

DETAILED DESCRIPTION OF ILLUSTRATIVE EMBODIMENTS

In some embodiments described herein, a riding lawn mower or other tractor may provide a cutting platform for a user that can collapse or transform to a nearly flat profile that can then be stored vertically in a shed or garage.

In some embodiments described herein, a riding lawn mower may utilize battery storage, electric drives, drive-by-wire steering, and/or a seat which folds flat to provide a collapsible mower suited for easy storage. An electric tractor may have one or more collapsible features, such as a seat, main frame, electrically-adjustable deck height, user input device such as a joystick, and/or other features.

In some embodiments, an approach to collapsible or transformable lawn care equipment can be expanded to other items found in a garage which consume space, such as a snow blower or snow blower accessory that attaches to the front of a tractor with its own electric drive, a collapsible cart for hauling mulch or yard waste, an aerator, roller, edger, trimmer, etc.

In some embodiments, one or more batteries may be integrated or recessed into a main frame of the riding lawn mower to reduce the profile thereof.

In some embodiments, an electric riding mower may have features to minimize the vertical profile of the mower when collapsed for storage to less than 36 inches in height, less than 24 inches in height, or less than 18 inches in height.

In some embodiments, a riding lawn mower has a low height and a collapsible seat portion.

In some embodiments, a riding lawn mower is designed to be stored vertically or upright in a storage area, such as a garage or shed.

In some embodiments, a riding lawn mower has an adjustable cutting width ranging, for example from at least about 36 inches to less than about 60 inches.

In some embodiments, a riding lawn mower may have cutting decks with blades operable at over 5000 RPM or about 6000 RPM.

In some embodiments, a riding lawn mower may have at least one, at least two or at least three foldable or transformable components to reduce the profile or vertical height of the lawnmower such that vertical storage is made easier.

Figure 1:
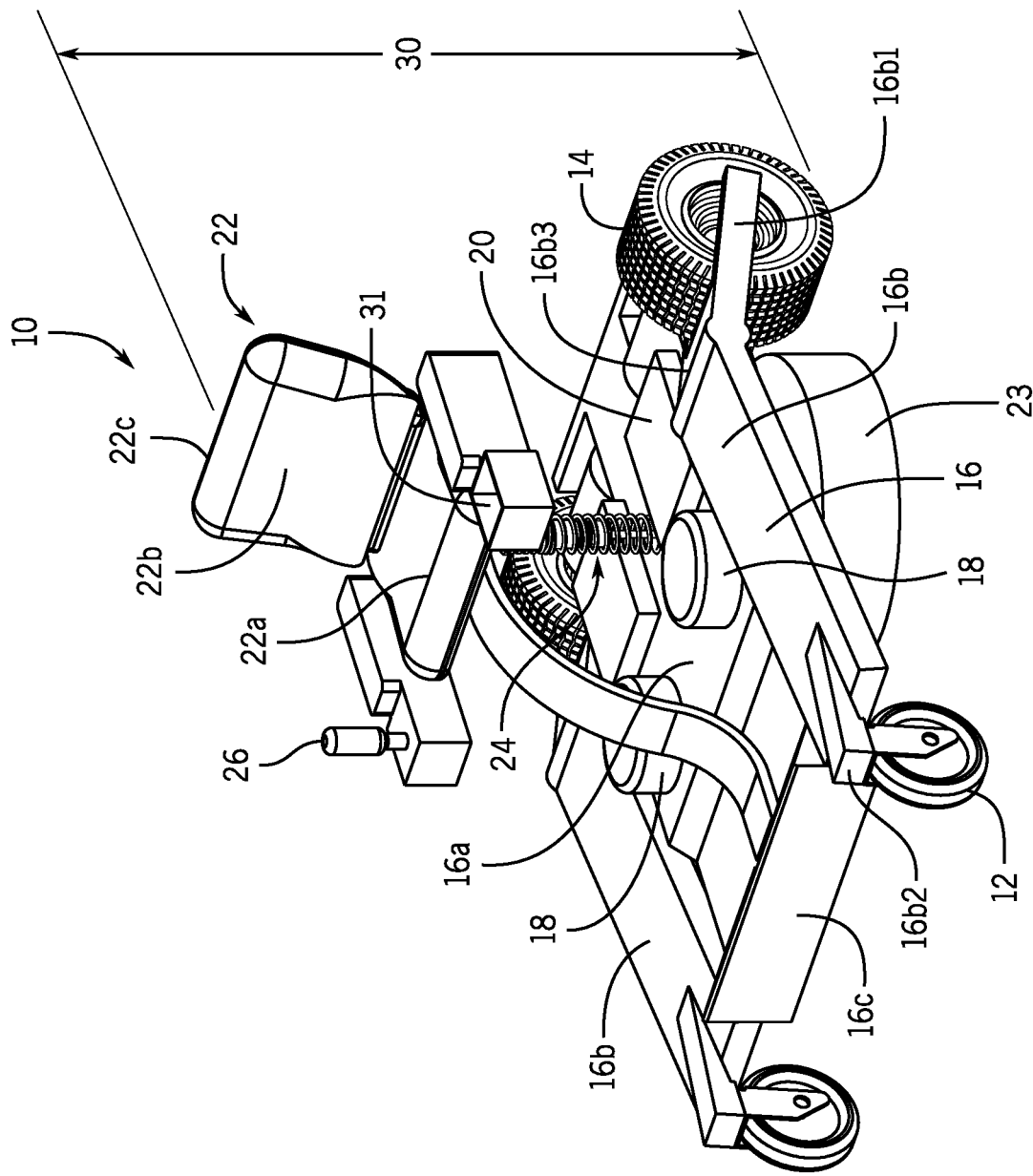
FIG. 1 is a perspective view of a riding lawn mower, according to an illustrative embodiment.

Referring to FIG. 1, a riding lawn mower 10 will be described according to a first embodiment. Riding lawn mower 10 may be any type of tractor lawnmower, ride-on lawnmower, or other mower designed for an operator to sit on while operating. Some features described herein may be applied to push mowers, towed mowers, or other lawn or garden equipment for providing different tasks for residential, commercial, or agricultural spaces. Mower 10 comprises at least one front wheel 12, which may be a plurality of wheels, such as two wheels, and at least one rear wheel 14 which may also be a plurality of wheels. In alternate embodiments, continuous tracks or other vehicle propulsion systems may be employed.

A frame 16 extends from front wheels 12 to rear wheels 14 and acts as a primary base in this embodiment. Frame 16 may comprise one or more portions or components coupled together to support one or more components of mower 10. For example, a battery support 16*a* may be disposed between two wheel supports 16*b* and may be configured to support one or more batteries 18. In a gas engine embodiment, battery 18 may provide power to start the engine. In an electric motor embodiment, battery 18 provides the power to drive the wheels and/or cutting blades. A footrest 16*c* portion of frame 16 may have an inclined surface configured to support the feet of an operator riding the mower. Other portions of the frame 16 may be provided for other functions. The various portions may be made of materials such as steel or other metals or alloys, polymers or plastics, composite materials, etc., which may be coupled together using welds, fasteners (e.g., bolts, etc.), or other couplings.

As shown, wheel support portions 16*b* of frame 16 may each comprise a first portion 16*b*1 providing an axle for a rear wheel and a second portion 16*b*2 providing an axle for a front wheel. Portions 16*b*1 and 16*b*2 may be coupled together at a pivot point 16*b*3 which can comprise a hinge, axle, or other pivot device to allow pivoting of first portion 16*b*1 relative to second portion 16*b*2, as will be described in greater detail below. Portions 16*b*1 and 16*b*2 may be movable relative to each other at pivot point 16*b*3 using manual or powered devices. For example, a drive mechanism, such as a linear drive motor or electric drive may be used to adjust an angle defined by the portions and the pivot over a range of values between near zero degrees and about 180 degrees, or in some embodiments, between an acute angle and an obtuse angle, or in some embodiments, between less than about 90 degrees and more than about 100 degrees. The drive mechanism (not shown) may be configured to rotate the second portion of the frame at the pivot point toward the first portion of the frame, whereby a force required to lift the mower at the front wheel is reduced, as will be described below with reference to FIGS. 4-5.

One or more motors 20 may be supported by frame 16. Motors 20 may be gas-powered motors, hybrid electric motors, electric or fully electric motors, or other motors or engines. Motor 20 may comprise an electric motor configured to draw power from the battery to drive the wheels and/or cutting blades. Motors 20 may be configured to drive wheels 12 and/or 14. Motors 20 may be configured to drive cutting blades disposed within cutting decks 23.

A seat 22 is disposed on a seat support 24, which is coupled to frame 16. Seat support 24 is configured to dispose seat 22 in a raised position (shown) in an extended operating state of mower 10. Seat support 24 is configured to dispose seat 22 in a lowered position in a collapsed storage state of mower 10. Seat support 24 may comprise any of a number of manual or powered actuating devices to move the seat between the raised and lowered positions, some of which will be described in greater detail below. Seat 22 comprises a seat bottom 22*a* and a backrest 22*b*. Backrest 22*b* is foldable toward and/or away from seat bottom 22*a* to provide a further collapsible or foldable aspect to mower 10. Backrest 22*b* may be joined to seat bottom 22*a* by a hinge or pivot mechanism at a pivot point.

A user input device 26, shown in this example as a joystick, is provided to allow an operator to control speed, direction, turning, etc. of mower 10. User input device 26 can comprise a drive-by-wire control device, a track ball, a hydraulic control device, an electromechanical control device, a touch screen or any other user input devices. User input device 26 may comprise a portion of a portable, hand-held device, such as a smartphone or tablet computer, which may communicate with a control circuit to provide user interface features comprising outputs and/or inputs. User input device 26 may comprise separate right and left hydraulic control handles, one for driving each of a right and left drive wheel or track.

A control circuit (not shown) may be coupled to user input device 26, motors 20, batteries 16, and/or other components of mower 10. The control circuit may comprise analog and/or digital electronic devices, such as microprocessors, microcontrollers, application-specific integrated circuits, input/output devices, and other electronics programmed to control mower 10 in accordance with commands from an operator and functions programmed (e.g., in firmware, hardware, etc.) by a manufacturer. For example, the control circuit may be configured to receive control signals from user input device 26 and control motors 20 to operate wheels to turn left or right, perform a zero-turn operation, adjust speed of the wheels, etc. The control circuit may be configured to receive commands from user input device 26 for raising or loving the deck and controlling an actuator to carry out the command on deck 23. The control circuit may be configured to receive commands to start, stop, control speed, etc. of cutting blades within deck 23. The control circuit may be configured to receive commands to collapse or fold (or extend or expand) any of the components of mower 10 that are designed for such movement. The control circuit may comprise one or more memories (e.g., random access memory, EEPROM, flash memory), one or more input/output circuits to receive a user input or provide a user display or graphical user interface, and one or more network communication circuits configured to communicate with other modules on the riding mower and/or other devices such as a smartphone, cellphone tower, Wi-Fi router, Universal Serial Bus drive, Ethernet network, etc.

Mower 10 may comprise one or more convenience features, such as a cell phone caddy 31, cup holder, drawer, radio, powered stand-alone Bluetooth speaker, etc.

According to one advantageous aspect, riding lawn mower 10 is collapsible from an extended operating state (shown in FIG. 1) to a collapsed storage state (as will be described below). An operator can collapse features of mower 10, such as seat 22, backrest 22*b*, user input device 26, deck 23 (raising/lowering and/or extending/retracting outside the frame), frame portions 16*b*, and/or other features. In some embodiments, when collapsed, mower 10 has a first vertical height, as measured from a ground surface to an upper edge of the seat 22*c* of less than about 28 inches, less than about 22 inches, and even less than about 18 inches. In some embodiments, when expanded into an operating state, mower 10 has a second vertical height (height 30) of more than about 30 inches, more than about 36 inches, more than about 42 inches, and even more than about 48 inches. The vertical height or profile of mower 10 may be determined by mower 10 in its horizontal orientation (relative to a ground surface) as shown in FIG. 1.

Another feature of mower 10 that allows a reduced vertical profile is that batteries 18 may be recessed within or set within frame 16. For example, a bottom surface of one or more batteries 18 may be below a top surface of frame 16 and/or of frame portion 16*a*. In another embodiment, batteries may be completely recessed within frame portion 16*a* or disposed beneath frame portion 16*a* or a cover thereof.

With a reduced vertical profile, mower 10 can more easily be stored and retrieved from storage.

According to another feature, mower 10 may be stored in a vertical orientation (with front wheels above rear wheels) by lifting mower 10 in its collapsed state at the front wheels. If casters or additional wheels are provided on a rear of mower 10, mower can be rolled on said casters and wheels 14 while in a substantially vertical orientation so that the mower can be moved against a wall of a storage area.

Figure 2:
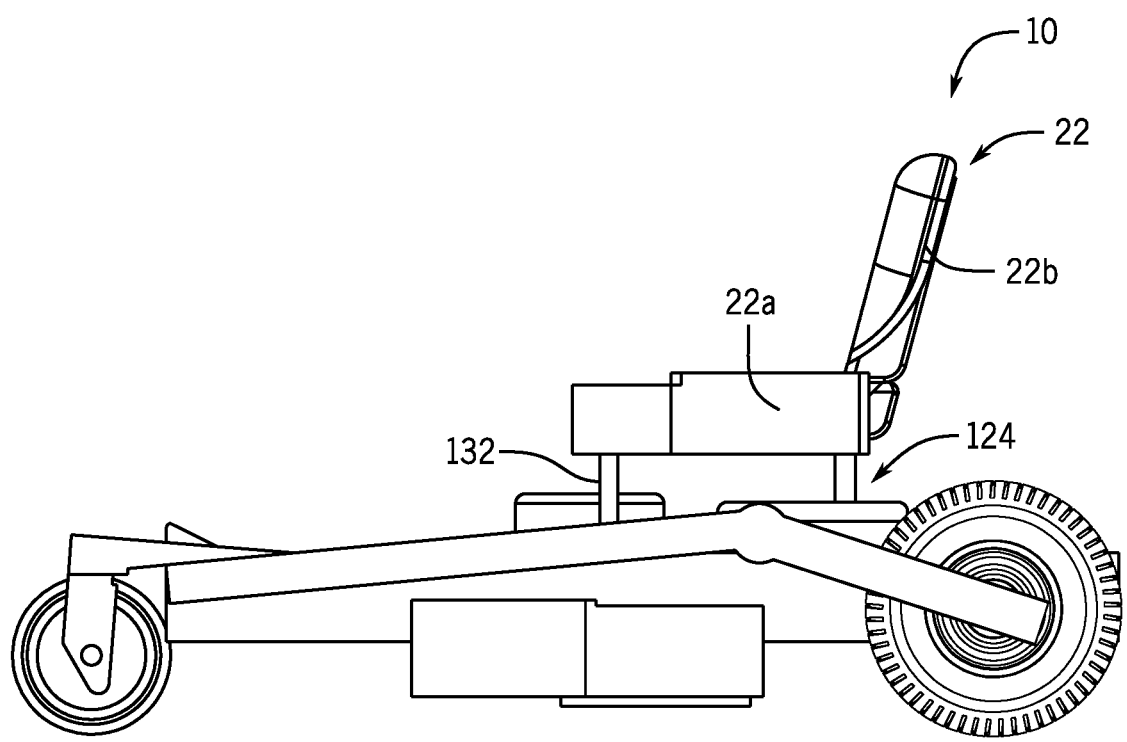
FIG. 2 is a side view of the riding lawn mower of FIG. 1 with a variation, according to an illustrative embodiment.
Figure 3:
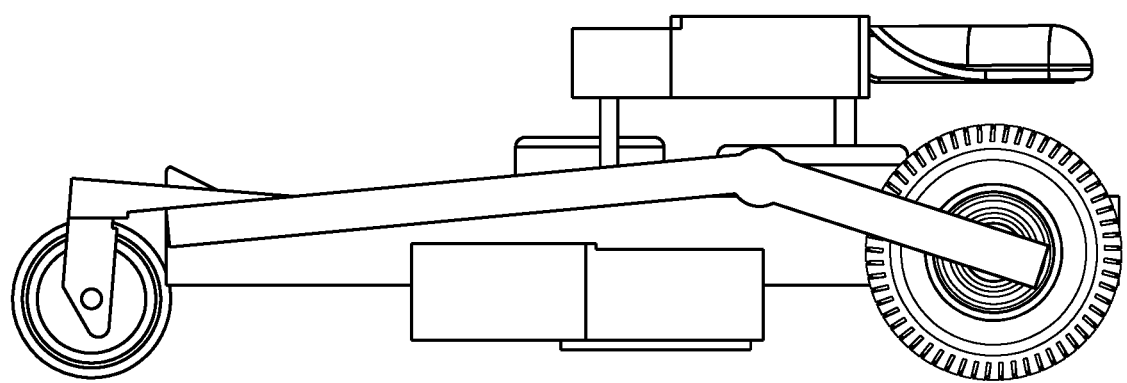
FIG. 3 is a side view of the riding lawn mower of FIG. 1 with the variation, shown in a collapsed mode, according to an illustrative embodiment.

FIGS. 2 and 3 are side views of mower 10 with a seat support 124 according to an alternative embodiment. Seat support 124 comprises one or more posts 132 (e.g., at least three posts, at least four posts, etc.) configured to couple seat bottom 22a to frame 16. Posts 132 may be part of a scissors lift, four-bar linkage, a powered lift mechanism or other retractable mechanism configured to raise and lower seat 22. In the embodiment shown, posts 132 are coupled to the frame and seat bottom 22a at respective pivot points, wherein the seat bottom 22a extends upward, travelling along an arc of a circle of about 90 degrees. Seat support 124 may be configured to move seat 22 from a raised position in the extended operating state to a lowered position in the collapsed storage state, wherein the seat base is generally horizontal in the raised position and in the lowered position. "Generally" horizontal refers to an orientation of a component having a primary plane that is more horizontal than vertical relative to a ground surface. "Substantially" horizontal refers to an orientation of a component having a primary plane that is within about 10-20 degrees of true horizontal. "Generally" vertical refers to an orientation of a component having a primary plane that is more vertical than horizontal relative to a ground surface. "Substantially" vertical refers to an orientation of a component having a primary plane that is within about 10-20 degrees of true horizontal.

In other embodiments, seat support 124 may be configured to move seat 22 from a stowed or collapsed position to a deployed or extended position while maintaining seat bottom 22a generally and/or substantially horizontal throughout the entire range of movement, or throughout a majority of the range of movement.

Seat support 124 may be configured to move seat 22 manually from a raised position to a lowered position, or movement may be done by a powered actuator that is controlled by the control circuit in response to user commands at the user input device. The powered actuator may be an electric drive mechanism, a linear drive, a hydraulic drive, etc.

Separately, backrest 22b may be configured (e.g., by way of a hinge or pivot mechanism) to move from a generally vertical position (as shown in FIG. 2) in the extended operating state away from seat bottom 22a (or alternatively toward seat bottom 22a) to a substantially horizontal position (as shown in FIG. 3) in the collapsed storage state.

Seat support 124 may comprise one or more vibration absorbing devices configured to reduce transmission of vibrations from the frame to the seat, such as a spring, a shock absorber, a hydraulic or gas piston, etc.

Figure 4:
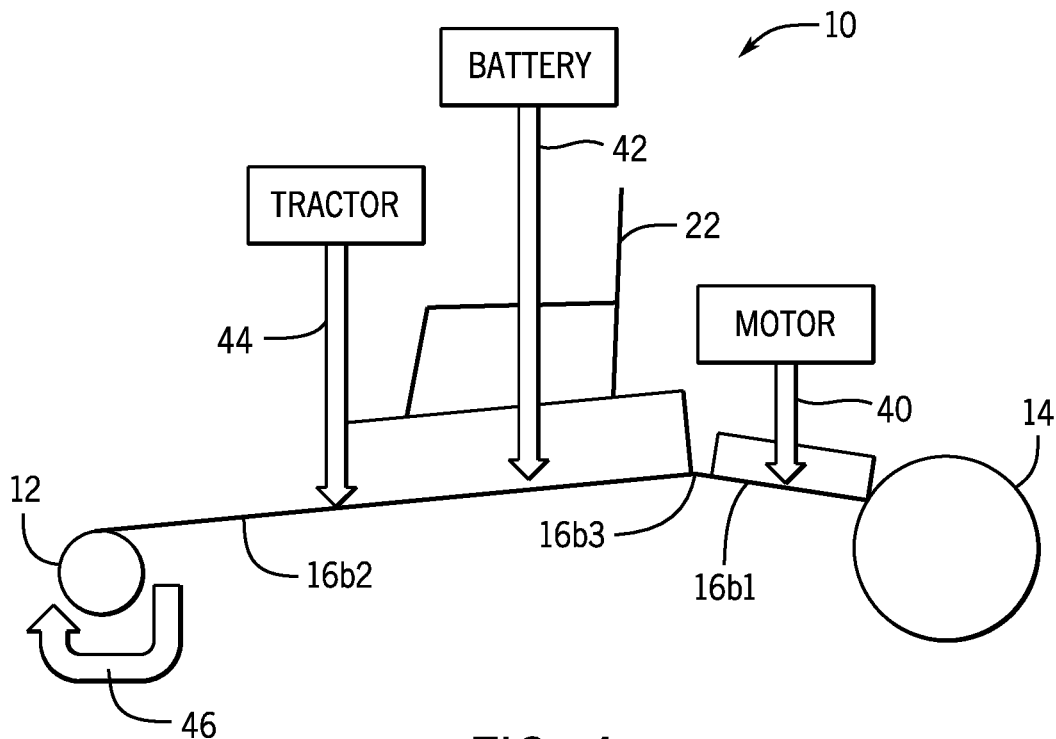
FIG. 4 is a free body diagram showing a mower in an expanded state, according to an illustrative embodiment.
Figure 5:
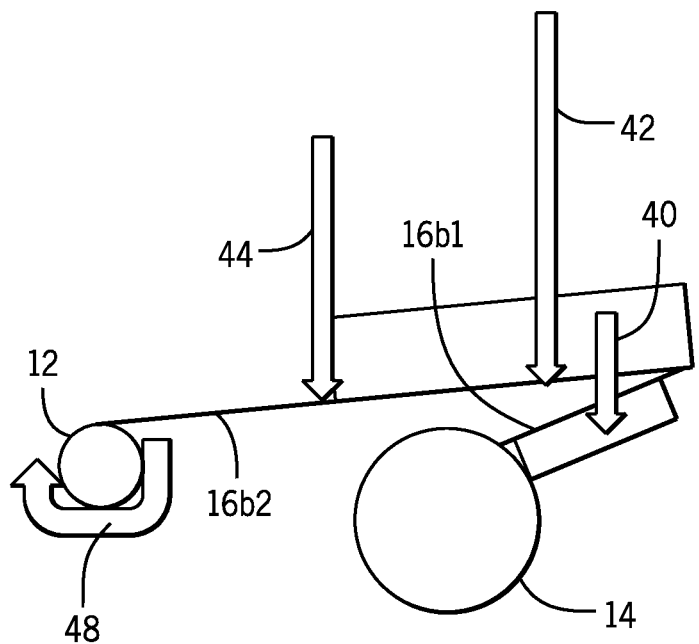
FIG. 5 is a free body diagram showing the mower of FIG. 4 in a compressed state, according to an illustrative embodiment.

Referring now to FIGS. 4 and 5, free body diagrams are used to illustrate other advantageous features of some embodiments. FIG. 4 illustrates mower 10 in an expanded, operating state. FIG. 5 illustrates mower 10 in a collapsed state, ready to be hoisted up at wheel 12 for vertical storage. First portion of frame 16b1 is coupled at a pivot point 16b3 to second portion of frame 16b2. In this state, the weights of the motor, battery and tractor (as indicated by motor vector 40, battery vector 42 and tractor vector 44), are borne between wheels 12 and 14. Should an operator attempt to lift mower 10 from its horizontal state to a vertical state for the purpose of storage, a large force (e.g., torque) is needed as shown by force vector 46.

In the collapsed or compressed state of FIG. 5, an operator has controlled a linear drive motor to fold first portion of frame 16b1 toward second portion of frame 16b2. The angle formed by the two portions therefore has decreased from an obtuse angle (as in FIG. 4) to an acute angle (as in FIG. 5). Now some of the weight previously borne between wheels 12 and 14 has shifted to the outside (or the right in the diagram) of wheel 14. In this example, the weight of the motor 40 and battery 42 have been shifted to the outside of wheel 14, though in alternative embodiments the weights of any one or more components of mower 10 may be shifted as such. In this case, wheel 14 acts as a fulcrum, making the force required to lift mower 10 to its generally vertical state smaller, as shown by smaller force vector 48.

In some embodiments, at least one of the motor and the battery is supported by the first portion of the frame 16b2 and the other of the motor and the battery is supported by the second portion of the frame 16b1.

In some embodiments, a drive mechanism is configured to rotate second portion of the frame 16b1 to a folded position making an acute angle with the first portion of the frame. The angle may be about 90 degrees, less than about 90 degrees, less than about 75 degrees, or other angles. A force required to lift the mower at the front wheel may be reduced in various embodiments.

In some embodiments, a plurality of rear wheels 14 act as a fulcrum to balance a first portion of the weight supported by the frame 16 on a first side of the fulcrum closest to the at least one front wheel 12 and a second portion of the weight supported by the frame 16 on a second side of the fulcrum opposite the at least one front wheel. The second portion of the weight may comprise at least one eighth of the first portion of the weight. In another embodiment, the second portion of the weight may comprise at least one fourth of the first portion of the weight. In another embodiment, forces are approximately evenly balanced on the rear wheel acting as a fulcrum, significantly reducing the torque required to lift mower into the vertical position.

Figure 6:
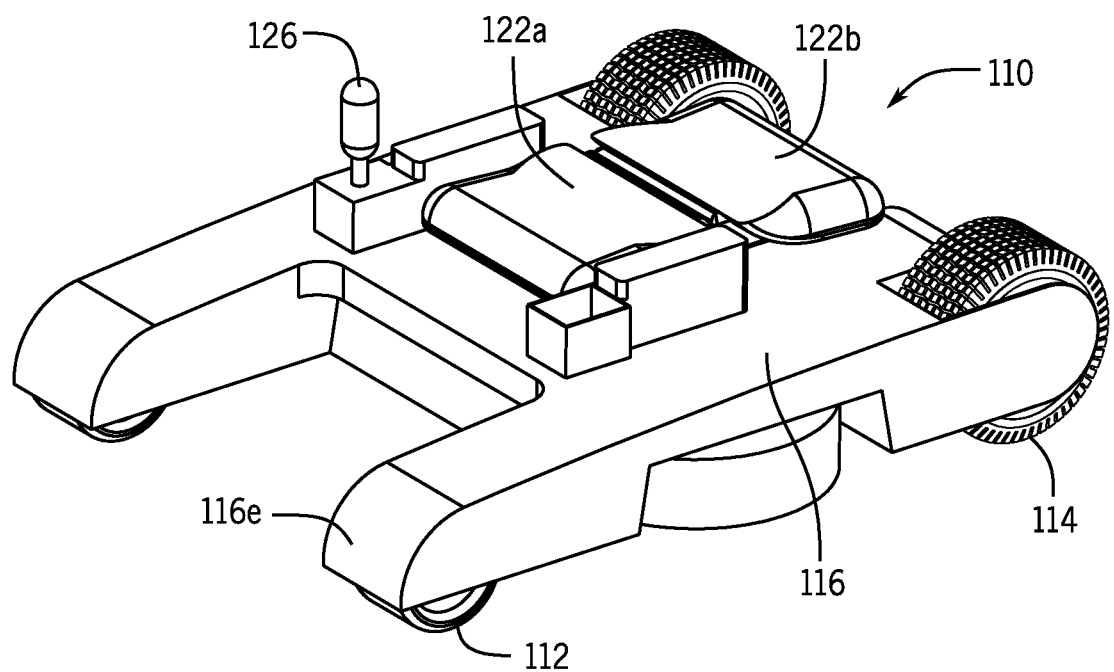
FIG. 6 is a perspective view of a riding lawn mower, according to another illustrative embodiment.

Referring now to FIG. 6, a perspective view of a mower 110 according to another embodiment will be described. Mower 110 may have features similar to those described above with reference to mower 10. In this embodiment, frame 116 has a non-pivoted portion extending from front wheels 112 to rear wheels 114 as one continuous member. Frame 116 has a substantially planar surface which can, in some embodiments, reduce or minimize the likelihood of grass collecting on frame 116 and being deposited into the storage area (e.g., garage, shed, etc.). Frame 116 may be fabricated as a single continuous piece as shown, which may further comprise wheel cover portions 116e. Seat 122 may comprise a seat base 122a which is supported directly on frame 116, without an intervening seat support. Alternatively, a foldable seat support may be used between seat base 122a and frame 116 so that seat base 122a may be elevated to a position more accommodating of an operator's legs while riding the mower 110. Backrest 122b may be foldable to a substantially horizontal position, manually and/or by a powered drive mechanism. User input device 126 may have a mechanical portion (e.g., a joystick) which is extendable and retractable (e.g., by rotating joystick or a housing coupled thereto from a vertical orientation to a horizontal orientation) to further reduce a vertical profile of mower 110.

Figure 7:
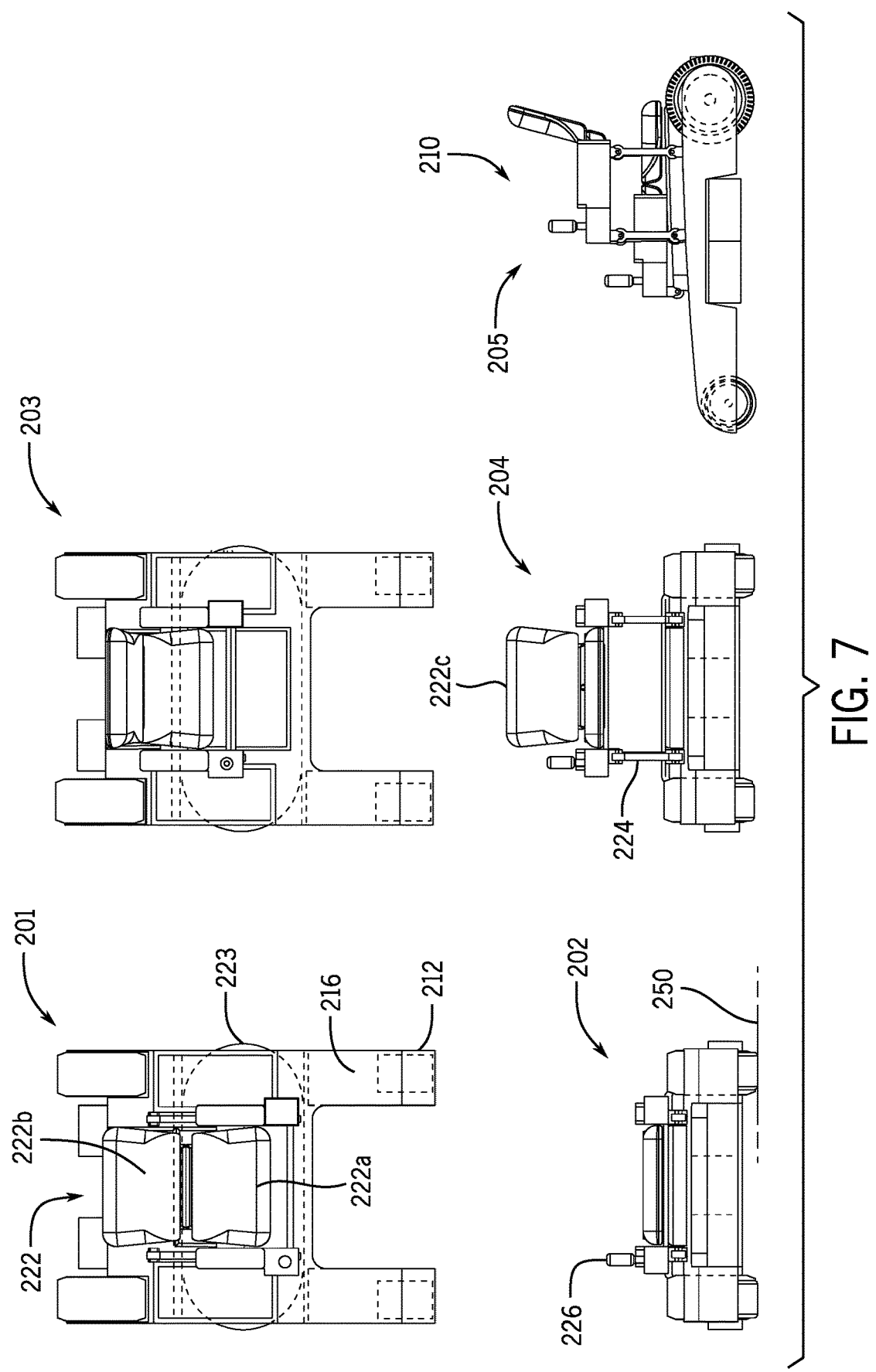
FIG. 7 is a set of images of a riding lawn mower, according to another illustrative embodiment.

Referring now to FIG. 7, a mower 210 according to another exemplary embodiment will be described. Mower 210 may have features similar to those described above with reference to mower 10 and/or mower 110. A first image 201 shows a top view of mower 210. Mower 210 has a frame 216. Frame 216 has a U-shaped cut-out which serves to reduce weight and material costs while still extending front wheels 212 forward for improved stability. Seat 222 is in a folded or collapsed state, in which seat support 224 is folded or collapsed such that seat bottom 222a is in a substantially horizontal position relative to a ground surface 250. Backrest 222b is also folded or collapsed such that backrest 222b is in a substantially horizontal position relative to ground surface 250.

Front image 202 shows a vertical profile from a ground surface 250 to an uppermost point or edge of seat 222 in its folded position. A vertical profile of less than 18 inches may be present in this embodiment. A user input device 226 may project above said vertical profile, or user input device 226 may fold or rotate downward from a vertical orientation to a horizontal orientation for improved storage.

Image 203 shows a top view of mower 210 in it extended or operational state. Image 204 shows that a vertical profile from a ground surface 250 to a top edge 222c of seat 222 is at least 36 inches. Support 224 comprises a plurality of linkages that are foldable, pivotable, or slidable from an extended position (image 204) to a folded substantially horizontal position (image 202). Image 205 is a composite image showing seat 222 in both extended and collapsed states. Notably, a major plane of seat bottom and/or backrest is substantially parallel with a ground surface in the collapsed state, though in alternative embodiments such parts may be at least generally parallel with a ground surface.

A width of frame 216 may be less than or about 40 inches, less than or about 50 inches, etc. A width of cutting deck 223 may be less than or about 42 inches. A length from front edge of front wheel and/or frame to a rear edge of rear wheel and/or frame may be at least 55 inches, less than 60 inches, etc. A diameter of a circular portion of deck 223 may be less than or about 18 inches, as shown in image 205.

Figure 8:
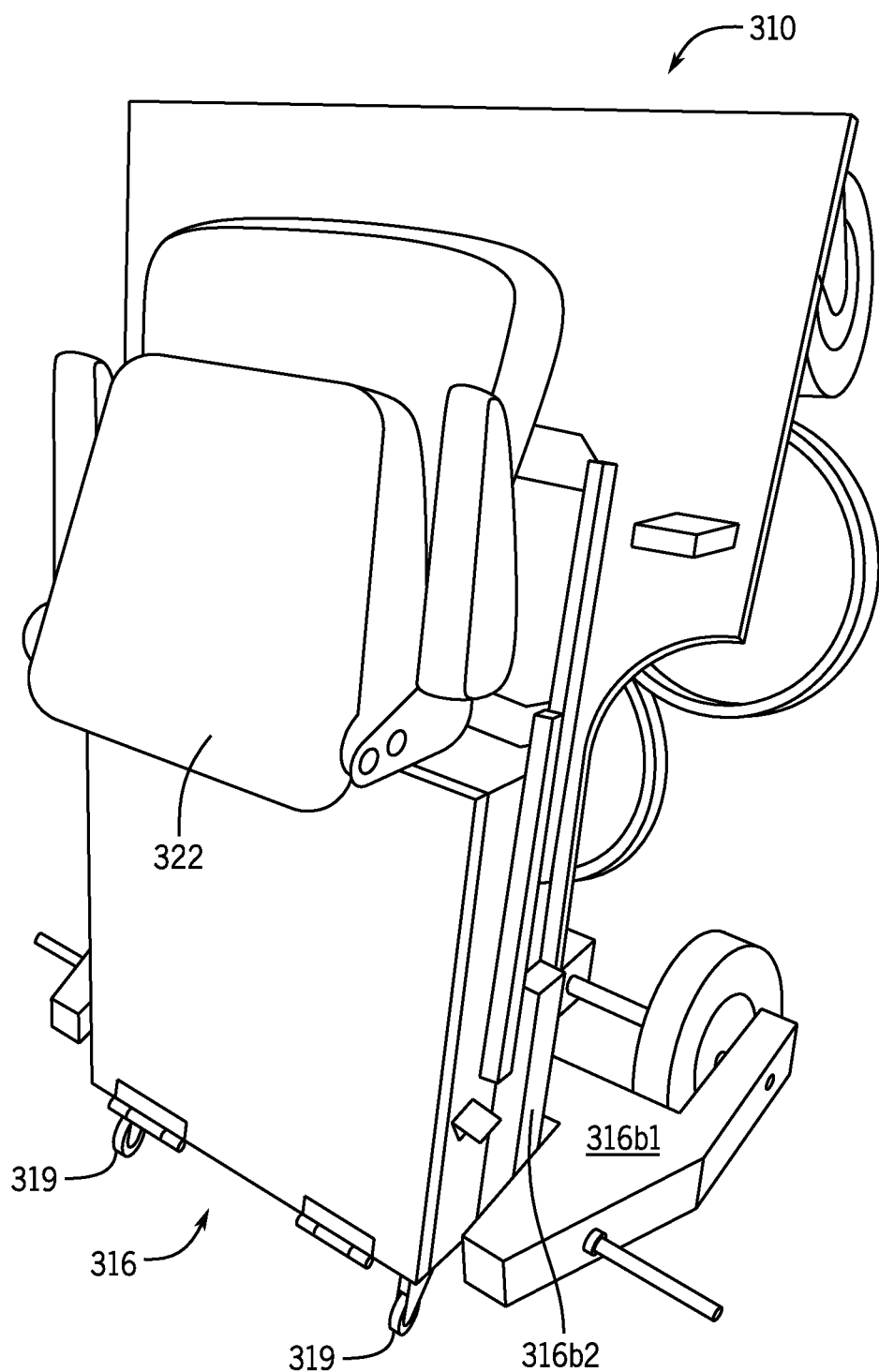
FIG. 8 is a right perspective view of a prototype of a riding lawn mower, according to an illustrative embodiment.
Figure 9:
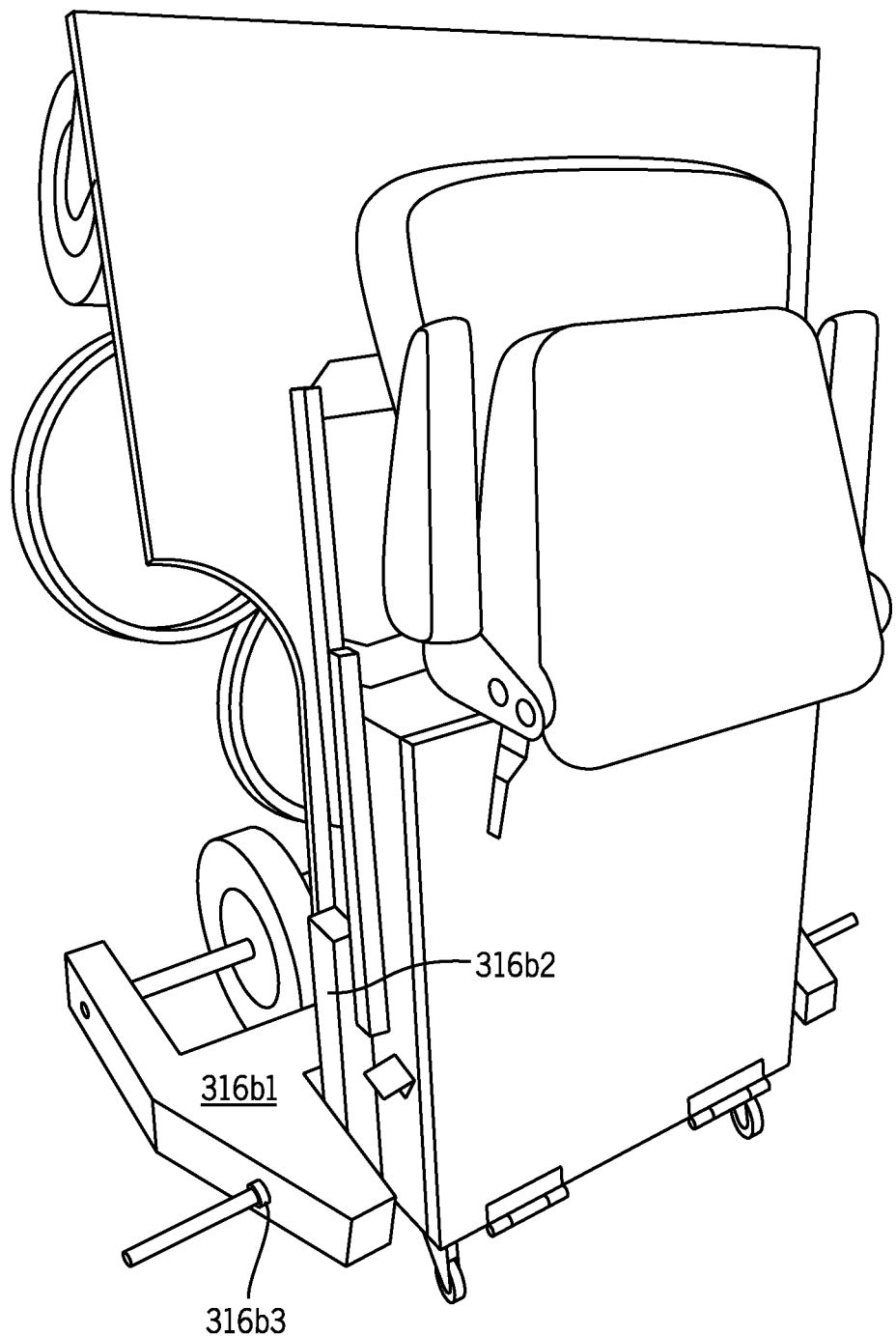
FIG. 9 is a left perspective view of the prototype, according to an illustrative embodiment.

Referring now to FIGS. 8-15, a riding lawn mower prototype embodying several features will be described herein, as well as a method of deploying a riding lawn mower from a collapsed storage state to an extended operating state. FIG. 8 shows mower 310 comprising a seat 322 and a frame 316. Frame 316 comprises a first frame portion 316b1 and a second frame portion 316b2 jointed at a pivot point 316b3 by an axle. Mower 310 is illustrated in FIGS. 8 and 9 in its collapsed state suitable for storage in a generally vertical orientation. Although second frame portion 316b2 is generally horizontal, a major plane of frame 316 is generally vertical as shown in the figures. Mower 310 may comprise casters or other supports 319 to, along with wheels 314 or other supports, help support mower 310 in its generally vertical orientation. The user of casters or other wheels allows easier movement of mower 310 to and from different locations in a storage area.

Figure 10:
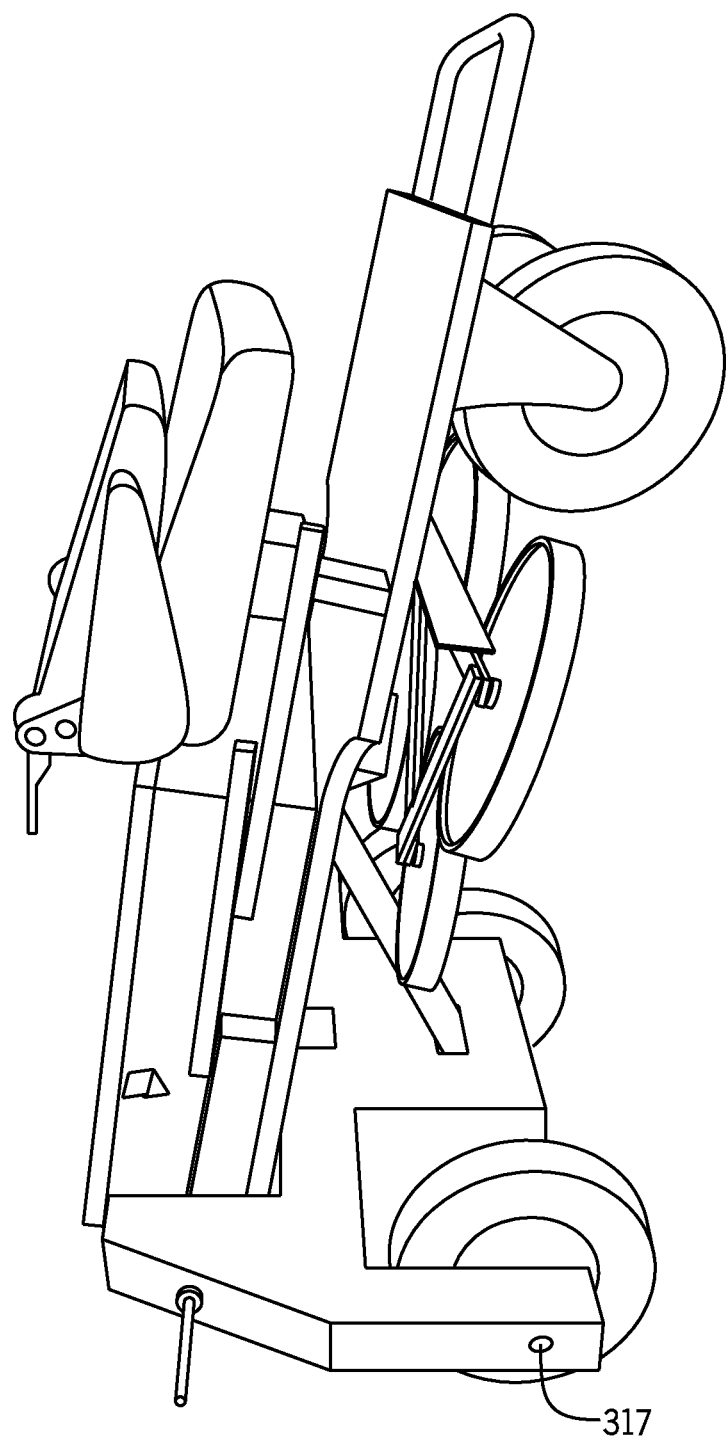
FIG. 10 is a side view of the prototype, according to an illustrative embodiment.
Figure 11:
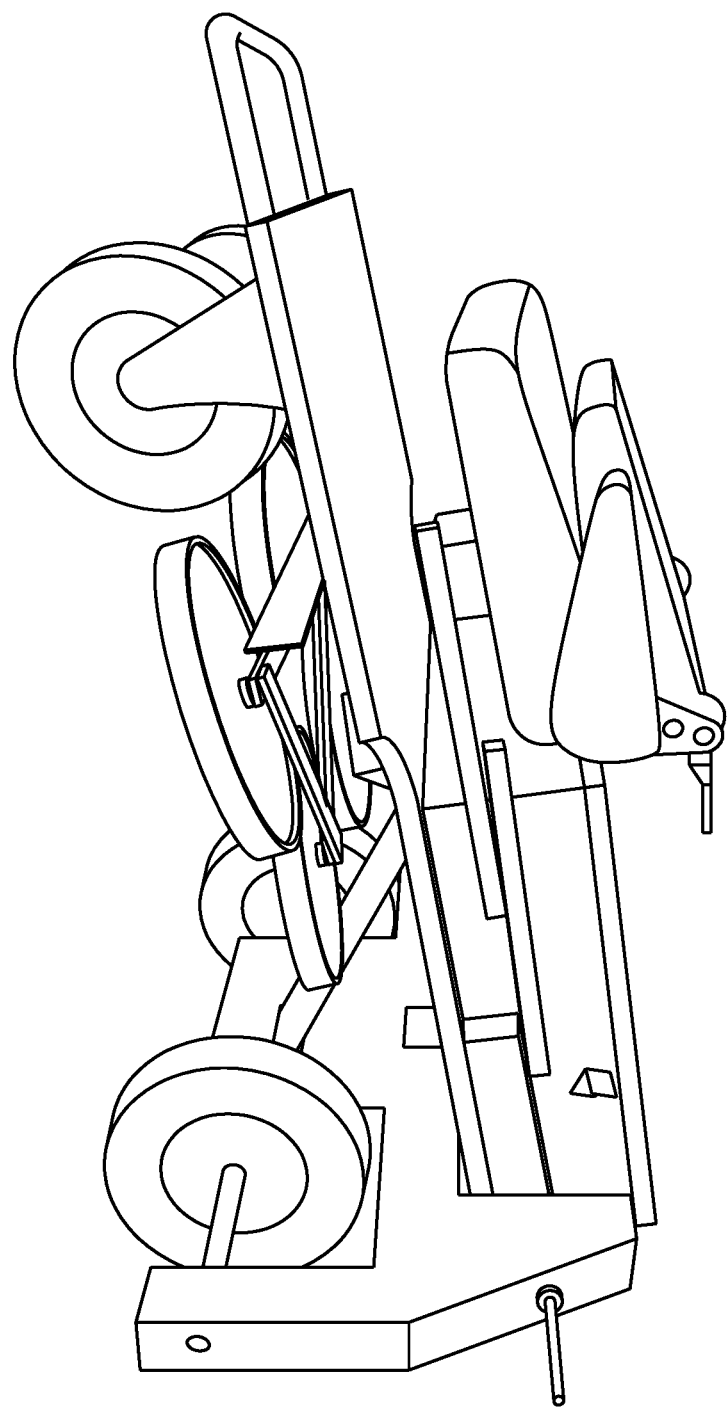
FIG. 11 is a side view of the prototype being lowered from a generally vertical orientation to a generally horizontal orientation, according to an illustrative embodiment.
Figure 12:
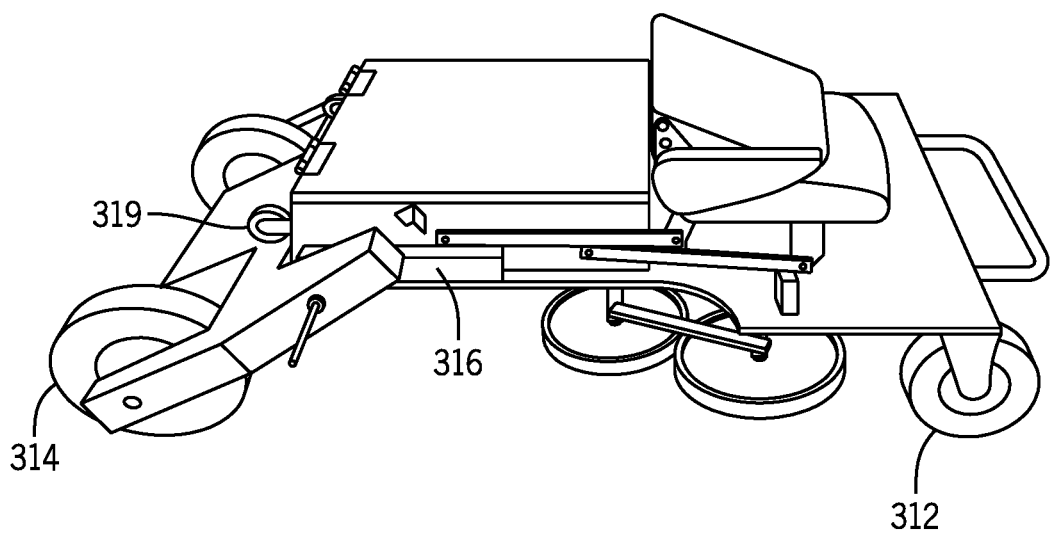
FIG. 12 is a side view of the prototype in a generally horizontal orientation in a compressed state, according to an illustrative embodiment.

As shown in FIGS. 10-12, a user may place a foot on axle 317 and pull on a top end of frame 316 to lower frame 316 from a generally vertical position to a lowered, substantially horizontal position as shown in FIG. 12. In this manner, the user is pivoting the riding lawn mower on the rear wheels from a generally vertical storage position to a generally horizontal use position. FIG. 12 shows casters 319 which are now out of contact with a ground surface. In the state shown in FIG. 12, mower 310 is resting on forward wheels 312 and rear wheels 314 and frame 316 is in a substantially horizontal position with an incline relative to a ground surface of between 10-30 degrees.

Figure 13:
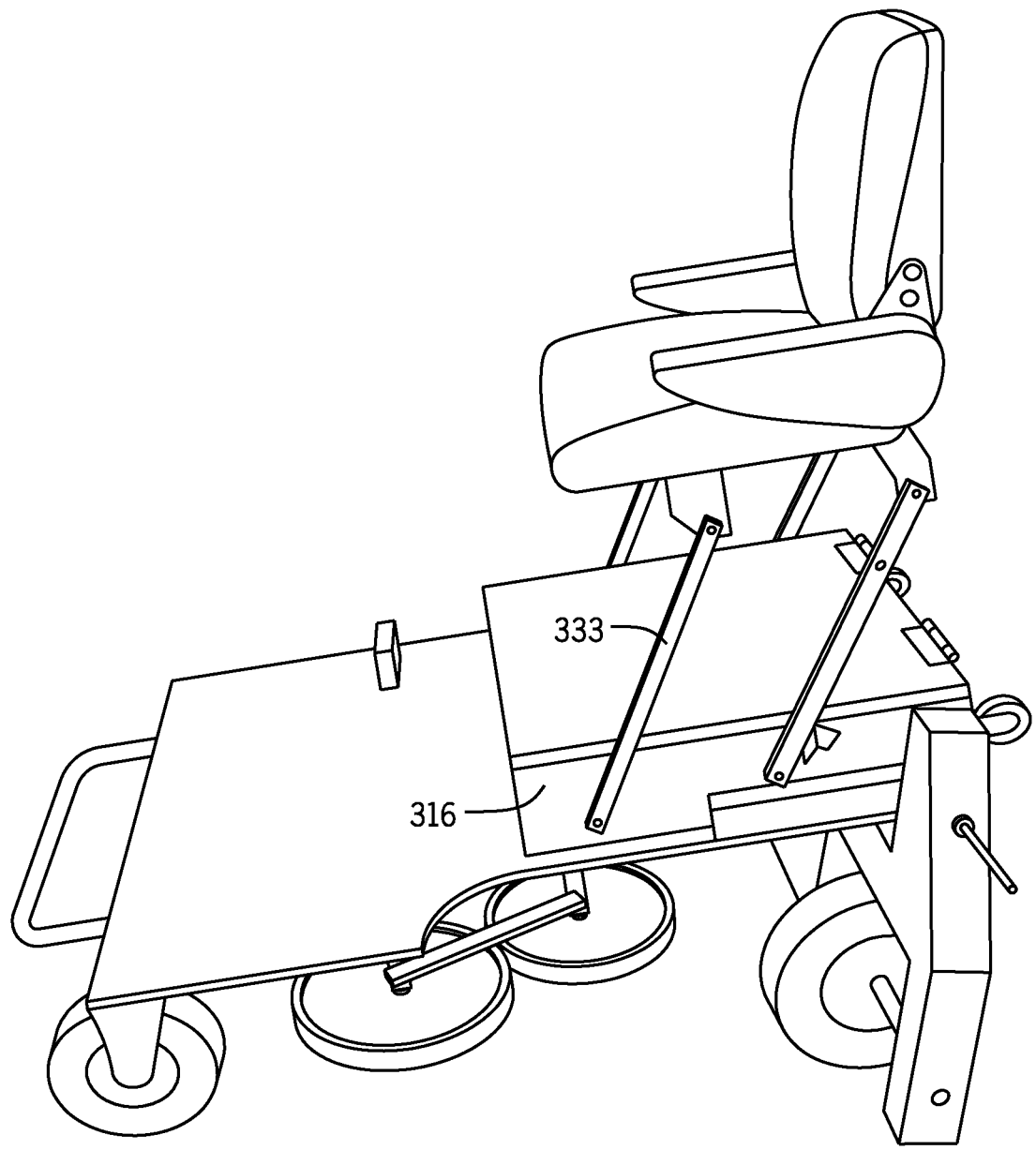
FIG. 13 is a side view of the prototype with the seat in an extended state, according to an illustrative embodiment.

As shown in FIG. 13, a user may manually move seat 322 to an extended position. A user is moving the seat from a lowered position to a raised position, the seat base being in a first generally horizontal position in the lowered position and a second generally horizontal position in the raised position. In this embodiment, seat support 314 comprises a plurality of posts that are foldable at pivot points. The pivot points may comprise a peg rotatable in an aperture, which may further comprise a locking or retaining device to hold the peg in the desired extended position. Additional posts 333 may be provided to hold seat 322 in an extended position. The movement of seat 333 may be manual or by way of a powered actuator under control of a control circuit. Movement of seat 333 may take place before, after, or simultaneously with the extension of the frame 316 as will be described next.

Figure 14:
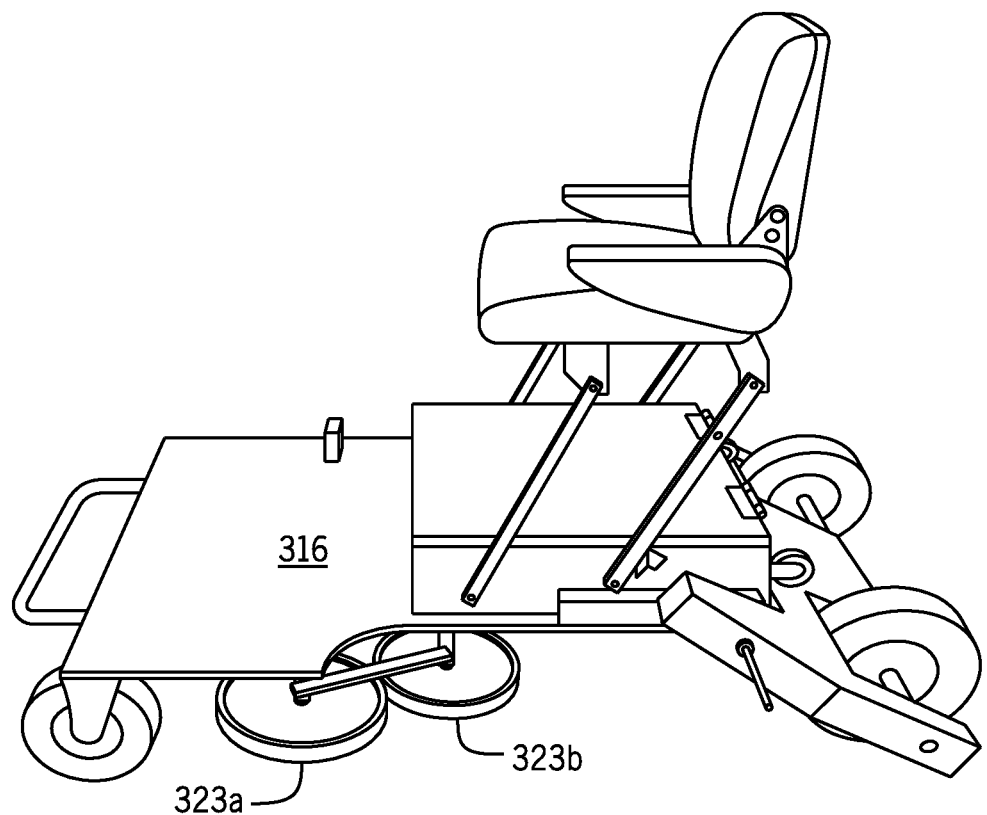
FIG. 14 is a side view of the prototype with the frame in an extended state, according to an illustrative embodiment.

Referring to FIGS. 13-14, first and second portions of frame 316 may be coupled together at a pivot point by way of an axle. In this embodiment, a linear drive motor is configured to move the first portion relative to the second portion, thereby deploying the rear wheels to an extended position by pivoting the second portion relative to the first portion through a predetermined angle.

In FIG. 13, in a compressed or folded state, first and second portions 316b1 and 316b2 form an acute angle therebetween. After extension, as shown in FIG. 14, the first and second portions form an obtuse angle therebetween. Thus, the second portion of the frame is pivoted relative to the first portion from an acute angle to an obtuse angle. In the extended position, the angle may be at least 100 degrees, at least 120 degrees, or other angles. In the extended position, a primary plane of frame 316 may be closer to parallel with a ground surface than in the folded position shown in FIG. 13.

Figure 15:
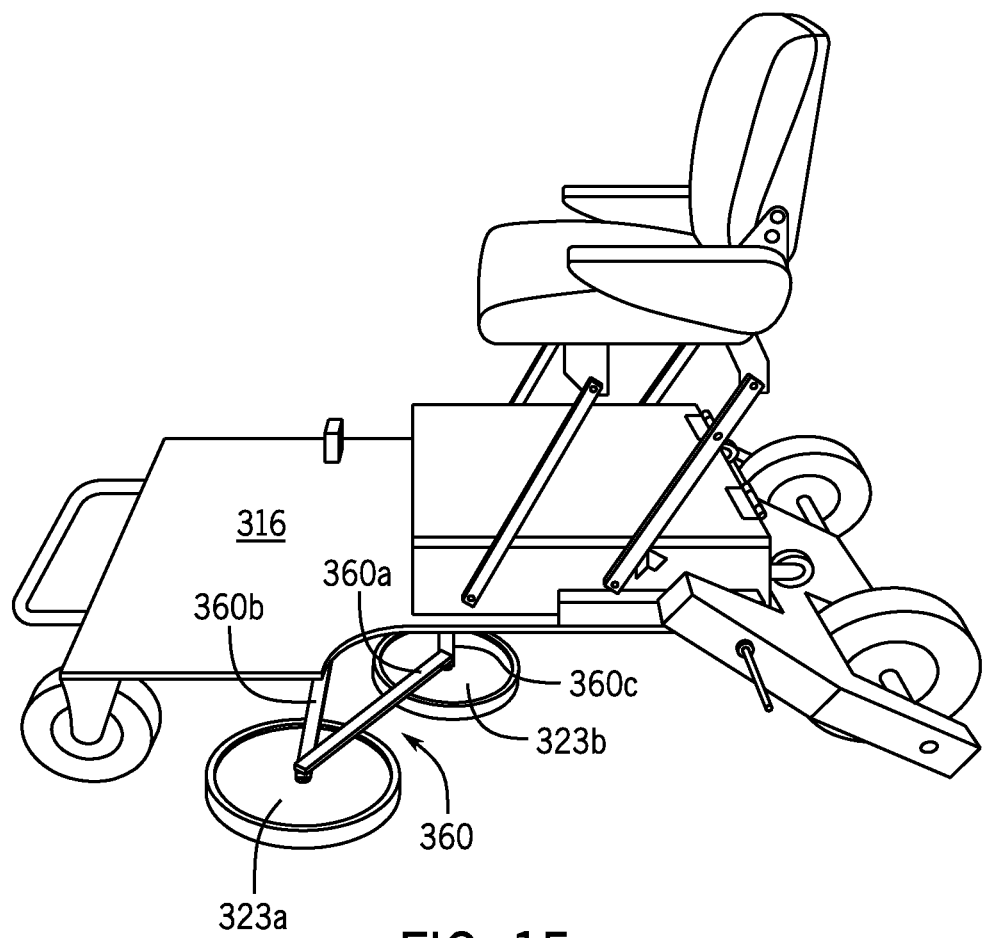
FIG. 15 is a perspective view of the prototype showing cutting decks in an extended state, according to an illustrative embodiment.

FIGS. 14-15 illustrate another feature of this embodiment. Mower 310 in this embodiment comprises a plurality of cutting decks 323a, 323b, etc. The method of deploying the riding lawn mower may further comprise extending at least one cutting deck 323a comprising a cutting blade from a stowed position (shown in FIG. 14) to a deployed position (shown in FIG. 15). The extension may be done manually by a user or a linear drive motor may be operated to move the cutting deck(s) from the stowed position to the deployed position. A cutting blade (not shown) may be disposed within the deck, the deck covering the blade. The cutting blade may be driven by a motor, such as the motors described above with reference to the embodiments of FIG. 1.

Cutting decks 323a, 323b, etc. may be coupled to frame 315 using one or more supports, linkages or couplings. In the embodiment shown, a linkage assembly 360 comprises a first link 360a coupling deck 323a to deck 323b and second and third links 360b and 360c coupling decks 323a and 323b to another deck (beneath frame 316, not shown). Each of links 360a, 360b and 360c may comprise an elongate bracket or tube having two ends, each end coupled to a center axis of a neighboring deck. The end couplings are pivotable to allow the link ends to rotate relative to the cutting decks. In this manner, linkage assembly 360 is configured to extend the blades horizontally from the stowed position to the deployed position, either under manual power or by way of a powered actuator under control from a control circuit. The deck support may comprise at least three linkages joining at least three cutting decks at the axes of rotation of the respective cutting blades of the cutting decks. Alternate supports for moving cutting decks 323a, 323b, etc. are contemplated.

By adjusting the cutting decks to a position within a range of positions from the stowed position to the fully extended position, a cutting width of mower 310 can be selected. In the fully stowed position, the decks are configured to provide a minimum cutting width. This fully stowed position may also be a storage position, the cutting decks being retractable inward to reduce the space needed to store the mower. In a fully extended position, the decks are configured to provide a maximum cutting width. A control circuit or user may be able to adjust a cutting width of the plurality of cutting decks to any width narrower than a maximum cutting width of the plurality of cutting decks. In some embodiments, the maximum cutting width is at least 50 inches and the width narrower than the maximum is less than 40 inches. The cutting width may be adjustable between at least about 36 inches and less than about 48 inches. In alternative embodiments, the width is adjustable between at least about 36 inches and less than about 60 inches. A maximum cutting width may be at least 50 inches and another selectable width narrower than the maximum may be less than 40 inches.

In some embodiments, the decks may be adjustable or movable over a range of cutting widths from about 36 inches to about 60 inches, from about 40 inches to about 50 inches, from about 24 inches to about 42 inches, or across other ranges. In one example, a user input device may be coupled to a control circuit to receive a selection from a user of a cutting width. The control circuit may receive the user input indicating the selected cutting width and control a motor to move the cutting decks to provide the selected cutting width. In an alternative embodiment, cutting width markings may be printed on frame 316, linkage assembly 360, or another portion of mower 310 to allow a user to manually extend and/or retract the decks until an indicator on the decks or linkage aligns with a desired cutting width marking. A lock mechanism may be provided to hold the decks in place at the desired cutting width, such as a peg attached to the deck assembly and biased to be retained in a slot on another portion of mower 310.

As shown in FIGS. 14 and 15, linkage assembly 360 or another support may be configured to extend at least one of the cutting decks laterally and/or horizontally from a stowed position beneath the frame to a deployed position outside of the extent of the frame, and thereby to adjust a cutting width provided by the blades. The cutting width refers to the approximate width of grass on a ground surface to be cut as the mower is operated by moving forward or backward. The blades are moved laterally or perpendicularly relative to a direction of forward travel of the mower. In some embodiments, the movement is horizontal or substantially horizontal in extension and/or retraction directions. In alternative embodiments, at least a portion of the extension and/or retraction movements of the cutting decks may comprise a vertical or substantially vertical component.

Figure 16:
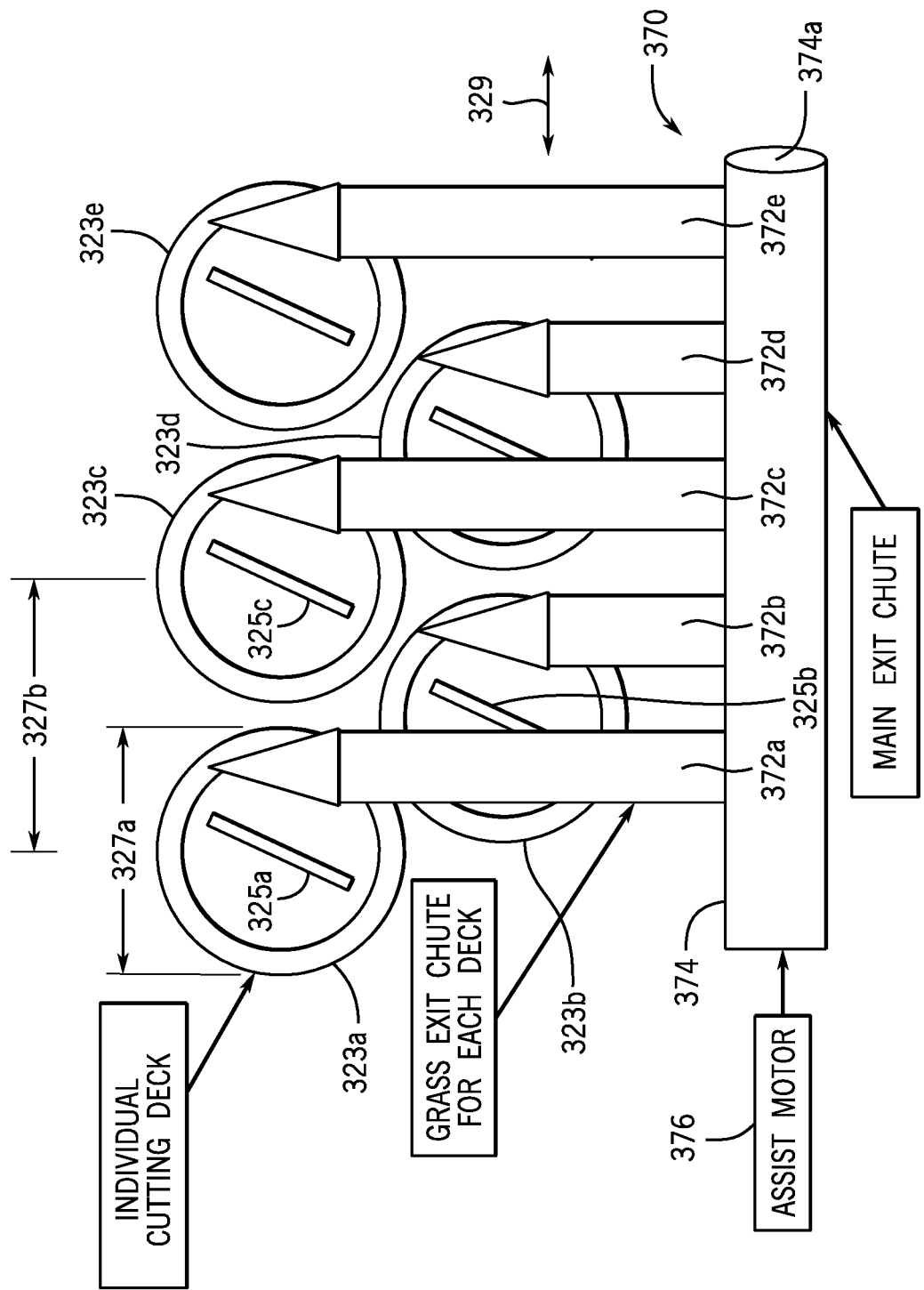
FIG. 16 is a top view of cutting decks and a grass flow assembly, according to an illustrative embodiment.

Referring now to FIG. 16, each of cutting decks 323a-e has a respective cutting blade 325a-e which cuts a predetermined cutting width (e.g., about 12 inches, less than about 13 inches, etc.). For clarity, cutting widths 327a and 327b are shown. It can be seen that a cutting blade 325a of at least one cutting deck 323a has a first cutting width 327a which overlaps at least part of a second cutting width 327b of a second cutting blade 325b of a second cutting deck 323b. As one or more cutting decks are extended laterally (329), a reduction or increase of this overlap occurs. Extending deck 323a to the left increases the overall cutting width while reducing the overlap in cutting width between deck 323a and deck 323b. Retracting deck 323a to the right decreases overall cutting width while increasing overlap in cutting width between deck 323a and deck 323b. A similar increase/decrease can take place between cutting decks 323b and 323c, between decks 323c and 323d and/or between decks 323d and 323e.

Figure 17:
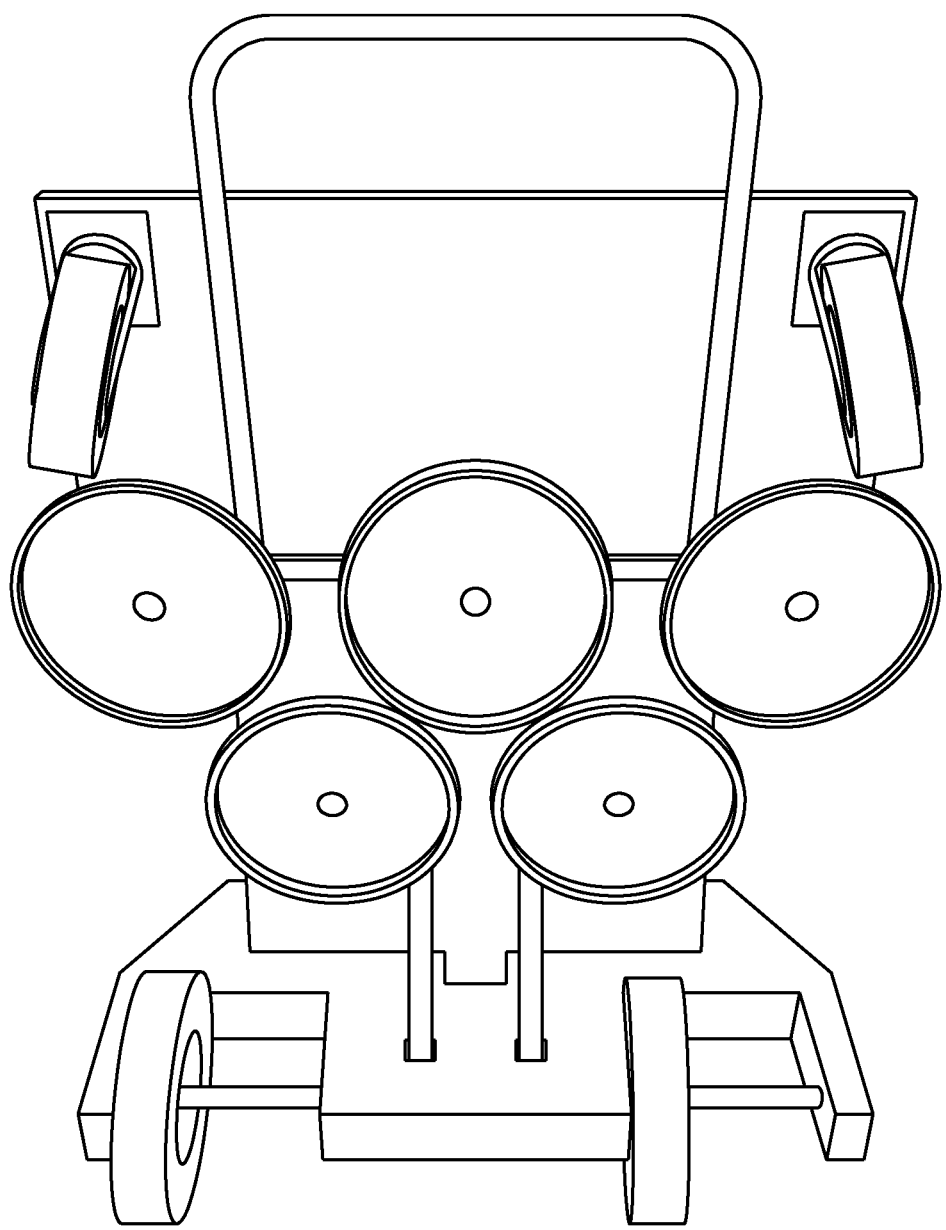
FIG. 17 is a view showing a bottom of the prototype and the deck in the collapsed state, according to an illustrative embodiment.

In some embodiments, the cutting deck support 360 (FIGS. 14-15) and/or a second support may be configured to extend cutting decks laterally out opposite sides of the frame 360 (when viewed from above). Such supports may also be configured to retract cutting decks laterally within or at least partially within the side edges of frame 360, a shown in FIG. 17.

The number of decks shown is five, though in alternative embodiments the number of decks may be at least two, at least three, at least four, at least five or other numbers. In the case of an odd number of decks, one deck may be disposed in a fixed position substantially at a center axis of forward travel of the frame of the mower, while additional cutting decks are movable. In one embodiment, two cutting decks are disposed on each side of the frame, two on the left side and two on the right side, as shown in FIG. 16.

The arrangement of cutting decks illustrated in FIG. 16 has three cutting decks disposed generally forward of two cutting decks. In an alternative embodiment, at least two cutting decks may be disposed forward of at least three cutting decks. In another embodiment, the at least two cutting decks may be recessed between two front wheels to provide a more compact arrangement of parts.

FIG. 16 illustrates additional features of various embodiments. In some embodiments, a riding lawn mower may comprise a grass flow arrangement 370. Grass flow arrangement 370 may comprise a chute for one or more of the cutting decks, such as chutes 372a-e. Each of chutes 372a-e may be aligned with a corresponding cutting deck and/or cutting blade in a position to receive grass clipping from the respective cutting deck and/or cutting blade. For example, with blades rotating clockwise as shown in FIG. 16, chutes may be arranged with a chute opening or chute end on a right-side portion of the respective deck. The chutes may be made from any of a variety of materials, such as plastic, metals such as steel, polymers, etc. In one advantageous embodiment, the chutes are made of a flexible material to allow decks 323a-e to move laterally as described above with the receiving ends of the chutes remaining attached to their respect decks 323a-e.

A main chute 374 may be coupled to chutes 372a-e with depositing/outlet ends of the chutes 372a-e open to apertures in the side of main chute 374. In this manner, main chute 374 is configured to receive grass clippings from the chutes 372a-e. Main chute 374 itself has a depositing/outlet end 374a which opens to a side or rear of the mower to deposit grass clippings received from chutes 372a-e to the side or behind the mower as it mows.

An assist motor 376 may be coupled to an end of main chute 374 and/or chutes 372a-e to drive a fan configured to blow air through the chute to assist in the movement of grass therethrough. For example, the fan may be configured to blow grass clippings received in main chute 374 from cutting deck chutes 372a-e to expel the grass clippings out outlet end 374a.

In one embodiment, the fan and main chute are configured to generate a Venturi effect within the main chute to draw cut grass through the cutting deck chutes. In some embodiments, the assist motor is configured to drive the fan at a speed sufficient to generate a vacuum at each outlet end of the cutting deck chutes. In some embodiments, the assist motor may be configured to drive the fan at any of a range of different speeds, for example, to accommodate light, medium, or heavy flow of grass clippings.

FIG. 16 illustrates how grass can be exited from multiple cutting decks. Main exit chute can be a primary tube having a larger diameter than the cutting deck chutes. The blades may also be configured to generate forced air to move the grass into and/or through the cutting deck chutes. In one embodiment, the main chute may be configurable to exit grass left and/or right and/or downward underneath the mower. For example, the assist motor and fan may be removable by a user from one side and attachable to the other side of the main chute, for example using a friction fit, detents, bolts, or other coupling mechanism. In some embodiments, the main chute may comprise a first tube disposed within a second tube, each tube having holes that may be opened or blocked to allow a user to manually or via a powered motor align the holes to allow grass to be deposited underneath the chute.

In various embodiments, the decks and blades may take a variety of sizes and shapes. In one example, one or more of the blades have a blade diameter of about 12 inches or less (or about 16 inches or less). In some embodiments, the blades may be operable at a selected speed within a range of available speeds. In one embodiment, the blades may be operated at 18,500 feet per minute. With blades of smaller sizes, such as about 12 inches or less or about 16 inches or less, the blades may be operable at about 6000 rotations per minute or greater (or about 5000 rotations per minute or greater).

In some embodiments, the user input device may be—or may be in communication with—an application operable on a smartphone, tablet, or other handheld computing device. The application may provide features such as recommended cut times, recommend cut heights, mulch application, weed and feed applications, etc. The application may provide programming update features to the control circuit of the riding lawn mower of a wireless communication link, such as a Bluetooth, IEEE 802.11x, or other communication link.

In some embodiments, a user input device, which may be a smartphone, or other touch screen device separate from or integrated into the frame or seat of riding lawn mower, may be configured to command the control circuit of the mower to electronically adjust deck height, control torque/speed of the cutting blades, adjust the sensitivity of the joystick or other driving control to optimize ride comfort (e.g., more speed, less adjustment on the joystick, slow speed, more adjustment on the joystick). In some embodiments, a user may use the user input device to command the control circuit to reverse the direction of the motors (e.g., electric motors or other motors) driving the cutting blades, for example for cleaning, purging, or dislodging accumulated material from the blades and/or cutting decks.

In some embodiments, a separate electric motor may drive each of the plurality of rear wheels using power from respective batteries.

In some embodiments, the riding lawn mower is an electric riding mower which uses batteries and electric motors instead of a gasoline-powered engine.

In some embodiments, the use of electric motors instead of a gas-powered engine allows for a lower vertical profile to make storage easier and more efficient.

In some embodiments, the riding lawn mower has no steering wheel. In some embodiments, the riding lawn mower has no rack and pinion steering mechanism. The use of a drive-by-wire mechanism, such as a joystick or other small user input device, may further contribute to the low vertical profile achievable.

In some embodiments, having a collapsible seat support and collapsible backrest allow the mower to achieve a lower vertical profile.

In some embodiments, the assist motor and fan described herein may be removable from a portion of the mower and attached to a leaf blower unit. A retractable power cord may couple the assist motor and fan to the battery of the mower for a power supply.

In some embodiments, an integrated trimmer unit may be coupled to and removable from a portion of the mower. A retractable power cord may couple the trimmer unit to the battery of the mower for a power supply.

In some embodiments, an expandable/retractable deck as described herein may be produced as a stand-alone product or an add-on product for another riding lawn mower or lawn tractor.

In some embodiments, a method of deploying a riding lawn mower from a collapsed storage state to an operating state is provided. The riding lawn mower has front and rear wheels and a seat having a seat base and a backrest. The method comprises pivoting the riding lawn mower on the rear wheels from a generally vertical storage position to a generally horizontal use position and moving the seat from a lowered position to a raised position, the seat base being in a first generally horizontal position in the lowered position and a second generally horizontal position in the raised position. The riding lawn mower may have a frame with a first portion coupled to the front wheels and a second portion coupled to the rear wheels, the first and second portions coupled together at a pivot point, in which the method may further comprise deploying the rear wheels to an extended position by pivoting the second portion relative to the first portion through a predetermined angle. The second portion may be pivoted relative to the first portion from an acute angle to an obtuse angle. A linear drive motor may be provided to move the second portion relative to the first portion. The method may further comprise extending a cutting deck comprising a cutting blade from a stowed position to a deployed position. The method may further comprise operating a linear drive motor to move the cutting deck from the stowed position to the deployed position. The cutting deck may be disposed on a linkage configured to extend the blades horizontally from the stowed position to the deployed position. The riding lawn mower may comprise a plurality of cutting decks and the method may further comprise adjusting a cutting width of the plurality of cutting decks to a width narrower than a maximum cutting width of the plurality of cutting decks. The maximum cutting width may be at least 50 inches and the width narrower than the maximum may be less than 40 inches.

In another embodiment, a riding lawn mower having an adjustable cutting width may comprise at least one front wheel, a plurality of rear wheels, a frame extending from the at least one front wheel to the plurality of rear wheels, a plurality of cutting decks, each cutting deck comprising a cutting blade, a motor supported by the frame configured to drive the cutting blades of the cutting decks and a support configured to couple the cutting decks to the frame. The support may be configured to extend at least one of the cutting decks laterally from beneath the frame to adjust a cutting width provided by the blades. A cutting blade of the at least one cutting deck may have a first cutting width which overlaps at least part of a second cutting width of a second cutting blade of a second cutting deck, wherein extending the at least one cutting deck laterally results in a reduction of the overlap while extending the cutting width. The support and/or a second support may be configured to extend cutting decks laterally out opposite sides of the frame. The plurality of cutting decks may comprise at least two cutting decks disposed on each side of the frame. The cutting width may be adjustable between at least about 36 inches and less than about 48 inches. The cutting width may be adjustable between at least about 36 inches and less than about 60 inches. The support may comprise at least three linkages joining at least three cutting decks at the axes of rotation of their respective cutting blades. The mower may further comprise a linear drive motor configured to move the plurality of cutting decks from a stowed position to a deployed position. The support may be configured to extend the blades horizontally from a stowed position to a deployed position. The support may be operable to adjust a cutting width of the plurality of cutting decks to a width narrower than a maximum cutting width of the plurality of cutting decks. The maximum cutting width may be at least 50 inches and the width narrower than the maximum is less than 40 inches.

In another embodiment, a riding lawn mower may comprise at least one front wheel, a plurality of rear wheels, a frame extending from the at least one front wheel to the plurality of rear wheels, a plurality of cutting decks disposed beneath the frame, each cutting deck comprising a cutting blade, a motor supported by the frame configured to drive the cutting blades of the cutting decks and a support configured to couple the cutting decks to the frame. Each cutting deck may have an associated cutting deck chute aligned to receive cut grass from the cutting blade. A main chute may be coupled to the cutting deck chutes, the main chute having an outlet end. A fan may be coupled to the main chute and configured to blow air through the main chute to expel grass out the outlet end. The fan and main chute may be configured to generate a Venturi effect within the main chute to draw the cut grass through the cutting deck chutes. The plurality of cutting decks may comprise at least three cutting decks, each cutting deck being associated with a cutting deck chute. The cutting deck chutes may be flexible to accommodate movement of the cutting decks while remaining aligned to receive the cut grass from the cutting blades. An assist motor may be configured to drive the fan at a speed sufficient to generate a vacuum at each of the cutting deck chutes. The motor may be configured to drive the cutting blades at a range of different speeds.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described herein as acting in certain combinations and even initially claimed as such, one or more features from a claimed combination can in some cases be removed from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system modules and components in the embodiments described herein should not be understood as requiring such separation in all embodiments, and it should be understood that the described program components and systems can generally be integrated together in a single product or packaged into multiple products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A riding lawn mower having an extended operating state and a collapsed storage state, comprising:
   at least one front wheel;
   a plurality of rear wheels;
   a frame extending from the at least one front wheel to the plurality of rear wheels;
   a motor supported by the frame;
   a battery supported by the frame;
   a seat comprising a seat bottom and a backrest; and
   a seat support configured to move the seat from a raised position in the extended operating state to a lowered position in the collapsed storage state, wherein the seat bottom is generally horizontal in the raised position and in the lowered position, wherein the backrest is configured to move from a generally vertical position in the extended operating state away from the seat bottom to a substantially horizontal position in the collapsed storage state.

2. The riding lawn mower of claim 1, wherein the seat support is configured to be moved manually from the raised position to the lowered position.

3. The riding lawn mower of claim 1, further comprising an electric drive mechanism configured to move the seat support from the raised position to the lowered position.

4. The riding lawn mower of claim 1, wherein the seat support comprises a lift assembly comprising at least three posts configured to raise and lower the seat.

5. The riding lawn mower of claim 1, wherein the seat support comprises a lift assembly comprising a vibration absorbing device configured to reduce transmission of vibrations from the frame to the seat.

6. The riding lawn mower of claim 1, wherein the riding lawn mower has a vertical height from a ground surface to an upper edge of the seat in the collapsed storage state of less than about 28 inches.

7. The riding lawn mower of claim 6, wherein the riding lawn mower has a second vertical height from the ground surface to the upper edge of the seat in the extended operating state of at least 36 inches.

8. The riding lawn mower of claim 1, wherein the motor is an electric motor configured to draw power from the battery to drive the plurality of rear wheels.

9. A riding lawn mower having an extended operating state and a collapsed storage state, comprising:
   at least one front wheel;
   a plurality of rear wheels;
   a frame extending from the at least one front wheel to the plurality of rear wheels;
   a motor supported by the frame;
   a battery supported by the frame;
   a seat comprising a seat bottom and a backrest; and
   a seat support configured to move the seat from a raised position in the extended operating state to a lowered position in the collapsed storage state, wherein the seat bottom is generally horizontal in the raised position and in the lowered position, wherein the seat support comprises a lift assembly comprising at least three posts configured to raise and lower the seat.

10. The riding lawn mower of claim 9, wherein the seat support is configured to be moved manually from the raised position to the lowered position.

11. The riding lawn mower of claim 9, further comprising an electric drive mechanism configured to move the seat support from the raised position to the lowered position.

12. The riding lawn mower of claim 9, wherein the seat support comprises a lift assembly comprising a vibration absorbing device configured to reduce transmission of vibrations from the frame to the seat.

13. The riding lawn mower of claim 9, wherein the riding lawn mower has a vertical height from a ground surface to an upper edge of the seat in the collapsed storage state of less than about 28 inches.

14. The riding lawn mower of claim 13, wherein the riding lawn mower has a second vertical height from the ground surface to the upper edge of the seat in the extended operating state of at least 36 inches.

15. The riding lawn mower of claim 9, wherein the motor is an electric motor configured to draw power from the battery to drive the plurality of rear wheels.

16. A riding lawn mower having an extended operating state and a collapsed storage state, comprising:
   at least one front wheel;
   a plurality of rear wheels;
   a frame extending from the at least one front wheel to the plurality of rear wheels;
   a motor supported by the frame;
   a battery supported by the frame;
   a seat comprising a seat bottom and a backrest; and
   a seat support configured to move the seat from a raised position in the extended operating state to a lowered position in the collapsed storage state, wherein the seat bottom is generally horizontal in the raised position and in the lowered position, wherein the seat support comprises a lift assembly comprising a vibration absorbing device configured to reduce transmission of vibrations from the frame to the seat.

17. The riding lawn mower of claim 16, wherein the seat support is configured to be moved manually from the raised position to the lowered position.

18. The riding lawn mower of claim 16, further comprising an electric drive mechanism configured to move the seat support from the raised position to the lowered position.

19. The riding lawn mower of claim 16, wherein the riding lawn mower has a vertical height from a ground surface to an upper edge of the seat in the collapsed storage state of less than about 28 inches and wherein the riding lawn mower has a second vertical height from the ground surface to the upper edge of the seat in the extended operating state of at least 36 inches.

20. The riding lawn mower of claim 19, wherein the motor is an electric motor configured to draw power from the battery to drive the plurality of rear wheels.

* * * * *